No. 32,796. PATENTED JULY 9, 1861.
L. B. SOUTHWORTH.
CIRCULAR SAW FOR SAWING VENEERS, &c.
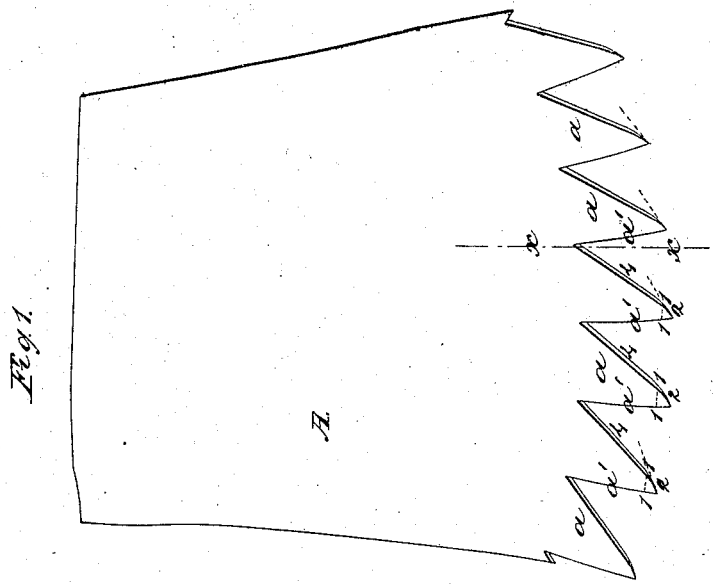
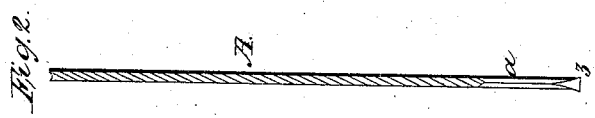
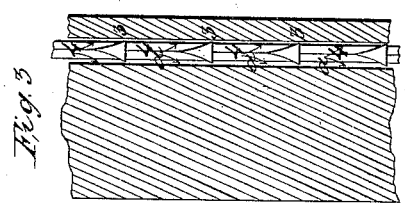
Witnesses
Inventor

UNITED STATES PATENT OFFICE.

LEVI B. SOUTHWORTH, OF DEEP RIVER, CONNECTICUT.

SAW-TOOTH.

Specification of Letters Patent No. 32,796, dated July 9, 1861.

*To all whom it may concern:*

Be it known that I, L. B. SOUTHWORTH, of Deep River, in the county of Middlesex and State of Connecticut, have invented a new and useful Improvement in Circular Saws for Sawing Wood Veneers, and also for Sawing Ivory into Thin Slabs for the Manufacture of Combs and other Articles; and I do hereby declare that the following is a full, clear, and exact description of the same, reference being had to the annexed drawings, making a part of this specification, in which—

Figure 1 is a side view of a portion of a circular saw, constructed according to my invention; Fig. 2, a section of the same, taken in the line $x, x$, Fig. 1; Fig. 3, an edge view of a portion of the same, represented in operation.

Similar characters of reference indicate corresponding parts in the several figures.

The object of this invention is to saw veneers and thin stuff from wood and ivory with a saw that will perform the work with a much narrower kerf than hitherto, and thereby effect a saving in stock. To effect this result I avoid the usual "set" which is given saw teeth and expand or spread the end of the saw teeth, which I make of chisel form, and have the upper edges of the teeth provided with a double bezel, all being arranged substantially as hereinafter described.

To enable those skilled in the art to fully understand and construct my invention I will proceed to describe it.

A, represents a portion or segment of a circular saw which may be of any desired dimensions, and $a$, are the teeth of the saw. These teeth are constructed in a peculiar manner. From their base outward to a line designated by 1, 1, they are of the usual form, but the points 2, of the teeth are formed at an angle, as shown clearly in Fig. 1, so as to give a chisel edge or cut to the teeth, the points 2, being inclined at an angle of about 45° with the radial sides or edges $a'$, of the teeth, as indicated by the dotted lines in Fig. 1. The teeth $a$, have no "set" being in the same plane with the body of the saw, but the edges or points 2, of the teeth are spread out or expanded by means of a burnisher so as to form a bur 3, at each side as shown clearly in Figs. 2 and 3. This bur 3, obviates the necessity of a "set" by cutting a kerf rather wider than the saw, so that the latter cannot bind in the kerf. The bur 3, is formed by pressing the burnisher against the cutting edges of the points 2, at the radial edges $a'$, of the teeth $a$.

The oblique edges 4, of the teeth are beveled at each side forming a double bezel, as shown clearly in Figs. 2 and 3. This double bezel admits of the ready escape of the dust from the kerf, as will be clearly seen by referring to Fig. 3, in which the red arrows indicate the direction in which the dust passes down at the sides of the teeth.

The bur 3, of the teeth admits of the latter cutting with far greater facility than when the usual "set" is employed, as each point 2, cuts square or in a direction at right angles with the plane of the saw, whereas the "set" given to teeth cause the cutting edges of the latter to have an oblique position, and this position greatly detracts from the efficiency of the cutting operation. There is another advantage attending the forming of the bur 3, on the points 2, of the teeth, and that is, the compacting of the metal at said points, renders the cutting edges more durable than they otherwise would be.

Having thus described my invention what I claim as new and desire to secure by Letters Patent, is:

The forming of the teeth $a$, of circular saws, by having the points 2, of the teeth inclined at an angle of about 45° with the radial edges thereof, said points being expanded or having a bur 3, formed by burnishing, so as to increase the width of the cutting edges, when said points 2, thus formed, are used in connection with the double bezel at the oblique edges 4, of the teeth, as and for the purpose herein set forth.

LEVI B. SOUTHWORTH.

Witnesses:
CHARLES W. SNOW,
JOHN MARVIN.